(12) United States Patent
Gardiner

(10) Patent No.: US 8,186,169 B2
(45) Date of Patent: May 29, 2012

(54) NITROGEN COOLED GAS TURBINE WITH COMBUSTOR NITROGEN INJECTION AND PARTIAL NITROGEN RECYCLING

(75) Inventor: Barrett David Gardiner, Malta, NY (US)

(73) Assignee: General Electric Company, Schenectady, NY (US)

( * ) Notice: Subject to any disclaimer, the term of this patent is extended or adjusted under 35 U.S.C. 154(b) by 34 days.

(21) Appl. No.: 12/910,033

(22) Filed: Oct. 22, 2010

(65) Prior Publication Data

US 2012/0096868 A1    Apr. 26, 2012

(51) Int. Cl.
*F02C 7/18*    (2006.01)

(52) U.S. Cl. ............................. 60/783; 60/39.12; 60/806

(58) Field of Classification Search ................... 60/39.12, 60/783, 784, 801, 806
See application file for complete search history.

(56) References Cited

U.S. PATENT DOCUMENTS

| | | | |
|---|---|---|---|
| 5,340,274 A | 8/1994 | Cunha | |
| 5,406,786 A | 4/1995 | Scharpf et al. | |
| 5,491,971 A | 2/1996 | Tomlinson et al. | |
| 5,611,197 A | 3/1997 | Bunker | |
| 5,782,076 A * | 7/1998 | Huber et al. | 60/782 |
| 6,065,282 A | 5/2000 | Fukue et al. | |
| 6,098,395 A * | 8/2000 | North | 60/806 |
| 6,217,280 B1 * | 4/2001 | Little | 60/806 |
| 6,253,554 B1 | 7/2001 | Kobayashi et al. | |
| 6,487,863 B1 | 12/2002 | Chen et al. | |
| 6,532,744 B1 * | 3/2003 | Reiter et al. | 60/806 |
| 6,574,966 B2 * | 6/2003 | Hidaka et al. | 60/806 |
| 6,578,362 B1 | 6/2003 | Coffinberry | |
| 6,718,794 B2 * | 4/2004 | Brugerolle et al. | 60/39.12 |
| 7,513,118 B2 * | 4/2009 | Benz et al. | 60/39.12 |
| 7,568,335 B2 * | 8/2009 | Althaus | 60/806 |
| 7,581,401 B2 | 9/2009 | West et al. | |
| 7,584,598 B2 * | 9/2009 | Benz et al. | 60/39.12 |
| 7,980,052 B1 * | 7/2011 | Paulino | 60/784 |
| 2002/0148213 A1 * | 10/2002 | Yu | 60/806 |

* cited by examiner

*Primary Examiner* — Ehud Gartenberg
*Assistant Examiner* — Lorne Meade
(74) *Attorney, Agent, or Firm* — Sutherland Asbill & Brennan LLP

(57) ABSTRACT

A nitrogen source supplies a flow of nitrogen to a cooling circuit in the turbine section of a gas turbine. The nitrogen in the cooling circuit absorbs heat from the turbine section and flows to a flow divider where the heated nitrogen is split into a combustor flow and a return flow. The combustor nitrogen flow is injected into the gas turbine combustor. The return nitrogen flow is returned to the flow of nitrogen supplied to the gas turbine cooling circuit.

11 Claims, 6 Drawing Sheets

NITROGEN COOLED GAS TURBINE WITH COMBUSTOR NITROGEN INJECTION AND PARTIAL NITROGEN RECYCLING

TECHNICAL FIELD

The present application relates generally to gas turbine engines and more specifically relates to a gas turbine engine with closed circuit nitrogen cooling as well as emissions control.

BACKGROUND OF THE INVENTION

Known integrated gasification combined cycle ("IGCC") power generation systems may include a gasification system that is integrated with at least one power producing turbine system. For example, known gasifiers may convert a mixture of a fuel such as coal with air or oxygen, steam, and other additives into an output of a partially combusted gas, typically referred to as a "syngas". These hot combustion gases may be supplied to a combustor of a gas turbine engine. The gas turbine engine, in turn, powers a generator for the production of electrical power or to drive another type of load. Exhaust from the gas turbine engine may be supplied to a heat recovery steam generator so as to generate steam for a steam turbine. The power generated by the steam turbine also may drive an electrical generator or another type of load. Similar types of power generation systems also may be known.

The known gasification processes also may generate flows of nitrogen. For example, an air separation unit may be used to generate a supply of oxygen to the gasifier. The air separation unit may generate oxygen by separating the oxygen from the nitrogen in a supply of air. Some of the nitrogen may be used to control emissions generated by the gas turbine engine or to augment power output of the turbine. For example, nitrogen may be injected into the combustion zone of the gas turbine engine to reduce the combustion temperatures and to reduce nitrous oxide ("$NO_x$") emissions. The turbine section of the gas turbine engine is cooled to maintain component temperatures to allowable material limits. The cooling, which is provided by air extracted from the compressor section, penalizes engine power output and heat rate.

There is thus a desire for an improved integrated gasification combine cycle power generation system. Such an IGCC system preferably would use all or most of the nitrogen generated therein for productive purposes while improving overall IGCC output and heat rate.

SUMMARY OF THE INVENTION

The present application thus provides an integrated gasification combined cycle system. The integrated gasification combined cycle system may include a nitrogen source, a combustor, and a turbine. A flow of nitrogen from the nitrogen source passes through and cools the turbine and then flows into the combustor.

The present application further provides a method of operating an integrated gasification combined cycle system. The method may include generating a flow of nitrogen, flowing the flow of nitrogen through a gas turbine, heating the flow of nitrogen as it flows through the gas turbine, injecting a portion of the now heated flow of nitrogen into a combustor, and reducing a combustor operating temperature.

The present application further provides an integrated gasification combined cycle system. The integrated gasification combined cycle system may include an air separation unit for generating a flow of nitrogen, a compressor for compressing the flow of nitrogen, a combustor, and a turbine. The compressed flow of nitrogen passes through and cools the turbine and then flows into the combustor.

These and other features and improvements of the present application will become apparent to one of ordinary skill in the art upon review of the following detailed description when taken in conjunction with the several drawings and the appended claims.

DETAILED DESCRIPTION

Figure 1:
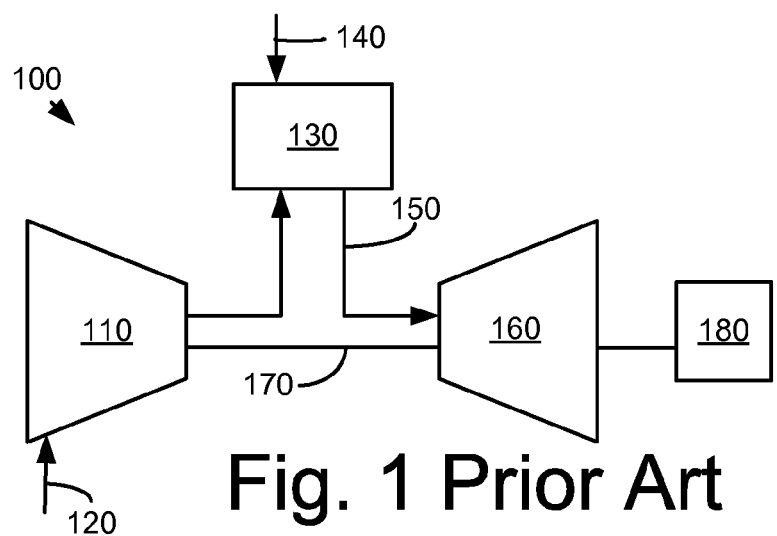
FIG. 1 is a schematic of a prior art gas turbine engine.

Referring now to the drawings, in which like numerals refer to like elements throughout the several views, FIG. 1 shows a schematic view of a gas turbine engine 100 as may be described herein. The gas turbine engine 100 may include a compressor 110. The compressor 110 compresses an incoming flow of air 120. The compressor 110 delivers the compressed flow of air 120 to a combustor 130. The combustor 130 mixes the compressed flow of air 120 with a compressed flow of fuel 140 and ignites the mixture to create a flow of combustion gases 150. Although only a single combustor 130 is shown, the gas turbine engine 100 may include any number of combustors 130. The flow of combustion gases 150 are in turn delivered to a turbine 160. The flow of combustion gases 150 drives the turbine 160 so as to produce mechanical work via the turning of a turbine rotor 170. The mechanical work produced in the turbine 160 drives the compressor 110 and an external load such as an electrical generator 180 and the like via the turbine rotor 170.

The gas turbine engine 100 may use natural gas, various types of syngas, and other types of fuels. The gas turbine engine 100 may be any number of different turbines offered by General Electric Company of Schenectady, N.Y. or otherwise. The gas turbine engine 100 may have other configurations and may use other types of components. Other types of gas turbine engines also may be used herein. Multiple gas turbine engines 100, other types of turbines, and other types of power generation equipment may be used herein together.

Figure 2:
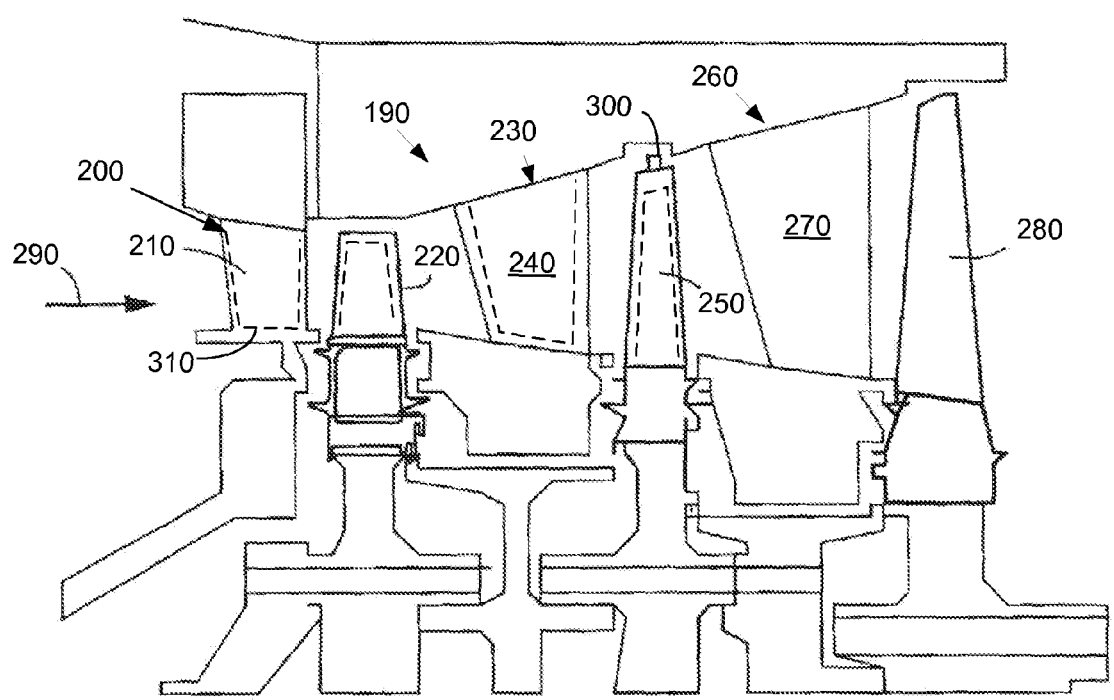
FIG. 2 is a schematic view of a number of stages of a gas turbine.

FIG. 2 shows a number of stages 190 of the turbine 160. A first stage 200 may include a number of circumferentially spaced first stage nozzles 210 and buckets 220. Likewise, a second stage 230 may include a number of circumferentially spaced second stage nozzles 240 and buckets 250. Further, a third stage 260 may include a number of circumferentially spaced third stage nozzles 270 and buckets 280. The stages 200, 230, 260 may be positioned in a hot gas path 290 through the turbine 160. Any number of stages 190 may be used herein. One or more of the buckets 220, 250, 280 may have a tip shroud 300 thereon. Other types of turbine configurations also may be used herein.

The rotating components, i.e., the buckets 220, 250, 280, and the stationary components, i.e., the nozzles 210, 240, 270, may have one or more cooling circuits 310 extending therethrough. In this example, the cooling circuit 310 may be a closed circuit. A cooling medium may pass therethrough so as to cool the components of the turbine 160 within the hot gas path 290. Other types of cooling configurations may be used herein.

Figure 3:
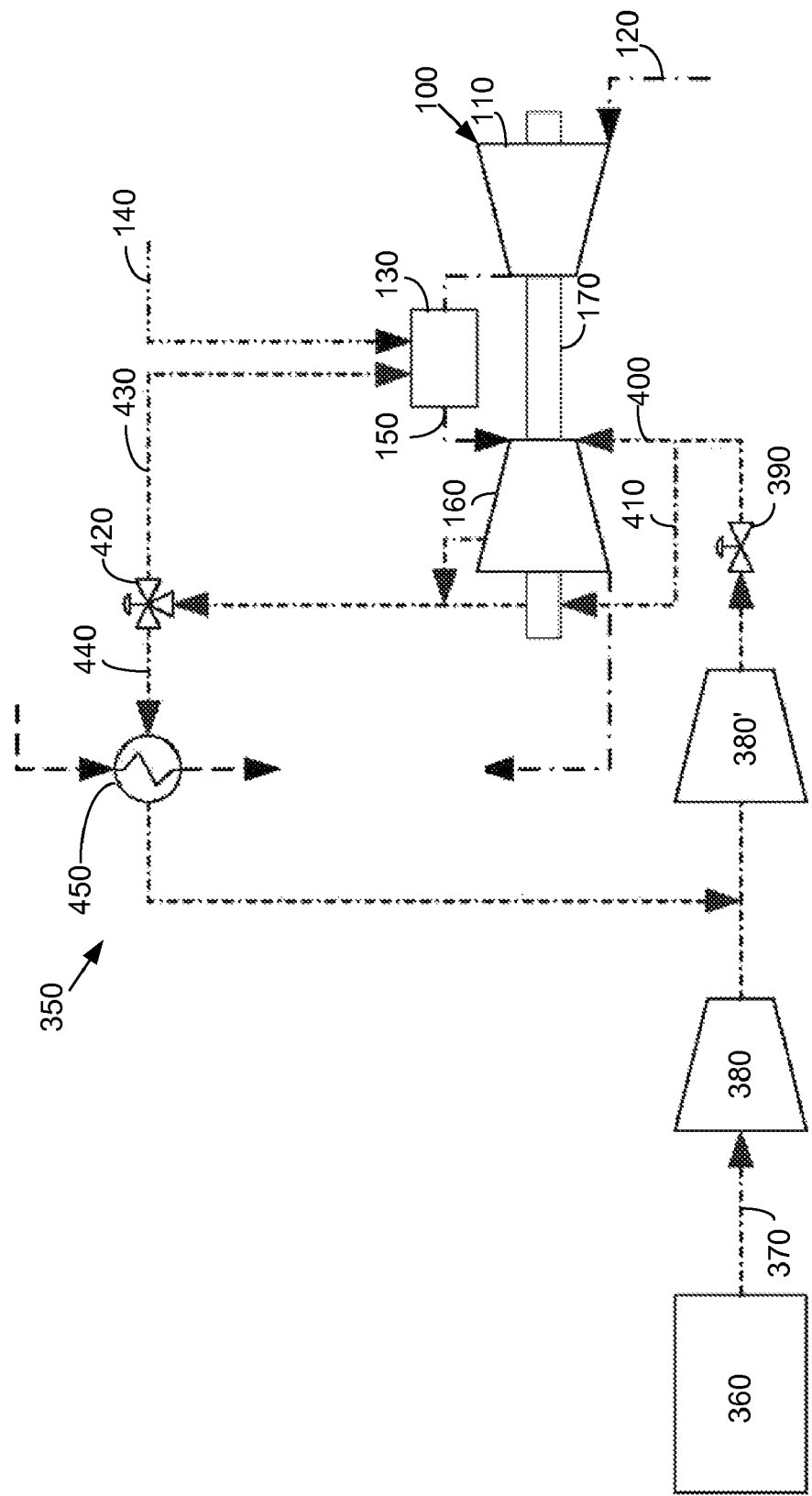
FIG. 3 is a schematic view of a portion of an integrated gasification combined cycle system with a nitrogen cooled gas turbine as may be described herein.

FIG. 3 shows portions of an integrated gasification combined cycle system 350 as may be described herein. The IGCC system 350 may includes the gas turbine engine 100 and the components thereof as is described above and also in similar configurations. The IGCC system 350 also may include an air separation unit 360. As is described above, the air separation unit 360 may be in communication with a gasifier (not shown) and the like. The air separation unit 360 may produce a flow of oxygen as well as a flow of nitrogen 370. Other sources of nitrogen and/or other gases also may be used herein.

In this example, the air separation unit 360 may be in communication with the turbine 160 of the gas turbine engine 100 via one or more nitrogen compressors 380, 385. The nitrogen compressors 380, 385 may be of conventional design. The nitrogen compressors 380, 385 compress the flow of nitrogen 370 to a sufficient pressure, i.e., a pressure sufficient to meet compressor diluent injection requirements plus all losses due to piping, equipment, turbine component coolant circuitry, and the like. A pressure control valve 390 also may be used. The pressure control valve 390 protects against over pressure via, for example, balloon stress mitigation and other techniques.

The flow of nitrogen 370 may be directed to the cooling circuit 310. The flow of nitrogen 370 may be divided into a stationary component cooling flow 400 to cool the stationary components therein and a rotating component cooling flow 410 to cool the rotating components therein. The cooling flows 400, 410 then may merge downstream of the turbine 160.

At a three-way valve 420 or at a similar type of flow device, the flow of nitrogen 370 again may be split, this time into a combustor flow 430 and a return flow 440. The combustor flow 430 may be delivered to the combustor 130 as a diluent injection for $NO_x$ emissions and/or gas turbine power augmentation. The return flow 440 may be cooled in a nitrogen cooler 450 via boiler feed water or another flow source to a temperature suitable for compression via the compressor 385. The return flow 440 may then be recirculated into the cooling circuit 310 or used for other purposes. The nitrogen cooler 450 may be any type of heat exchanger and the like. Other configurations may be used herein. Other types of flows also may be used herein.

Figure 4:
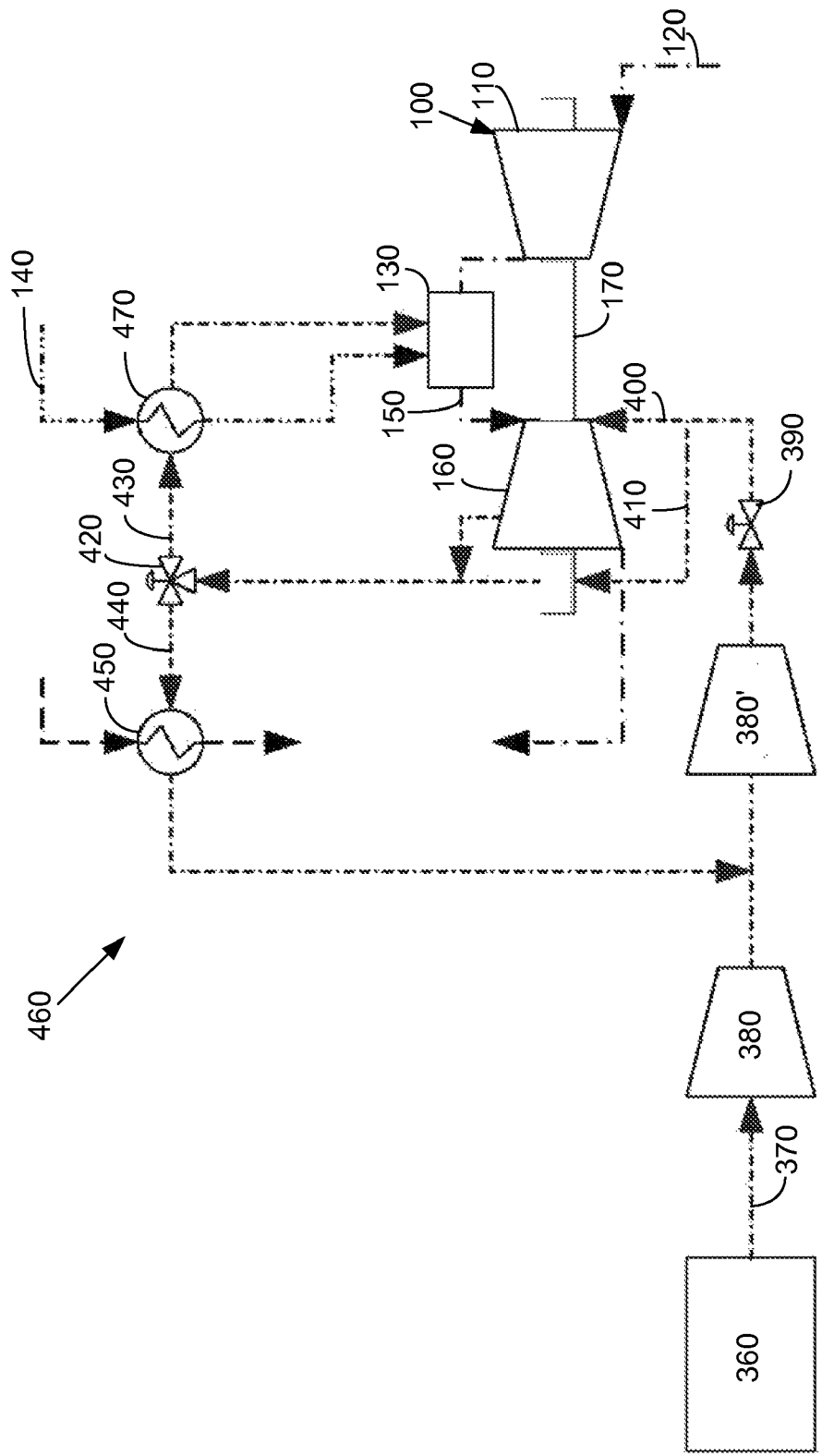
FIG. 4 is an alternative embodiment of the integrated gasification combined cycle system with a nitrogen cooled gas turbine.

FIG. 4 shows an alternative embodiment of portions of an integrated gasification combined cycle system 460. The IGCC system 460 may be similar to the IGCC system 350 described above and with the addition of a fuel heater 470. The fuel heater 470 may be in communication with the combustor flow 430 downstream from the turbine 160 and the flow of fuel 140. The combustor flow 430 may be cooled to an allowable maximum temperature based on combustion system design requirements by heat exchange with the incoming flow of fuel 140 either directly or via an intermediate heat exchange loop. Alternatively, the combustor flow 430 also may exchange heat with boiler feed water or other type of suitable cooling source. Other configurations may be used herein.

Figure 5:
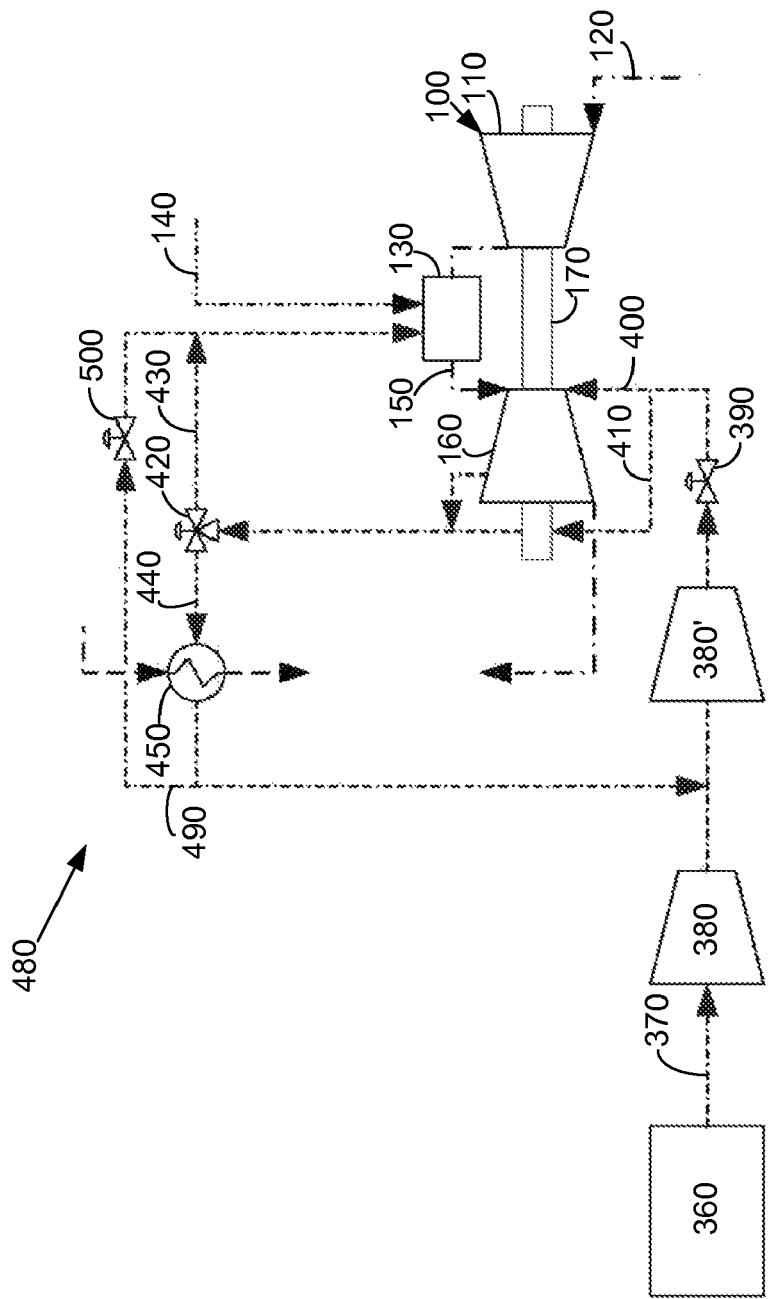
FIG. 5 is an alternative embodiment of the integrated gasification combined cycle system with a nitrogen cooled gas turbine.

FIG. 5 shows an alternative embodiment of an integrated gasification combined cycle system 480. The IGCC system 480 may be similar to the IGCC system 350 described above. In this example, the return flow 440 downstream of the heat exchanger 450 may include a mixing flow 490. The hot combustor flow 430 may be mixed with the cooled mixing flow 490 to an allowable maximum temperature before being injected into the combustor 130. A temperature control valve 500 also may be used herein. Other configurations may be used herein.

In use, the IGCC's 350, 460, 480 described herein utilize the flow of nitrogen 370 for hot gas path cooling and combustion diluent injection in a sequential arrangement so as to provide significant operational improvements in both power output and heat rate. Specifically, the IGCC's 350, 460, 480 may reduce the total amount of turbine component cooling air extracted from the compressor 110, may transfer high level energy from the hot gas path cooling directly to the combustion system, and may allow for optimization of turbine cooling flows and firing temperatures as a function of nitrogen cooling flow and temperature. The IGCC's 350, 460, 480 also may utilize the nitrogen coolers 450 to heat the boiler feed water or another source to produce steam for import into the bottoming cycle so as to increase steam turbine power output. The IGCC's 350, 460, 480 thus use all or most of the flow of nitrogen 370 produced via the air separation unit 360 or otherwise and/or recirculates the flow for further use.

The lower temperature of the nitrogen flow supplied to the turbine 160, as compared to a conventional compressor extraction flow, allows for a reduction in the required cooling flow so as to enable optimization of component cooling passages and overall gas turbine performance. The recovery of heat from the component cooling scheme to the combustor 130 via the hot combustor flow 430 thus should reduce the overall flow of fuel 140 and hence improve overall equipment heat rate. The lower temperature of the flow of nitrogen 370 also may result in a reduction in the total required cooling flow herein.

Figure 6:
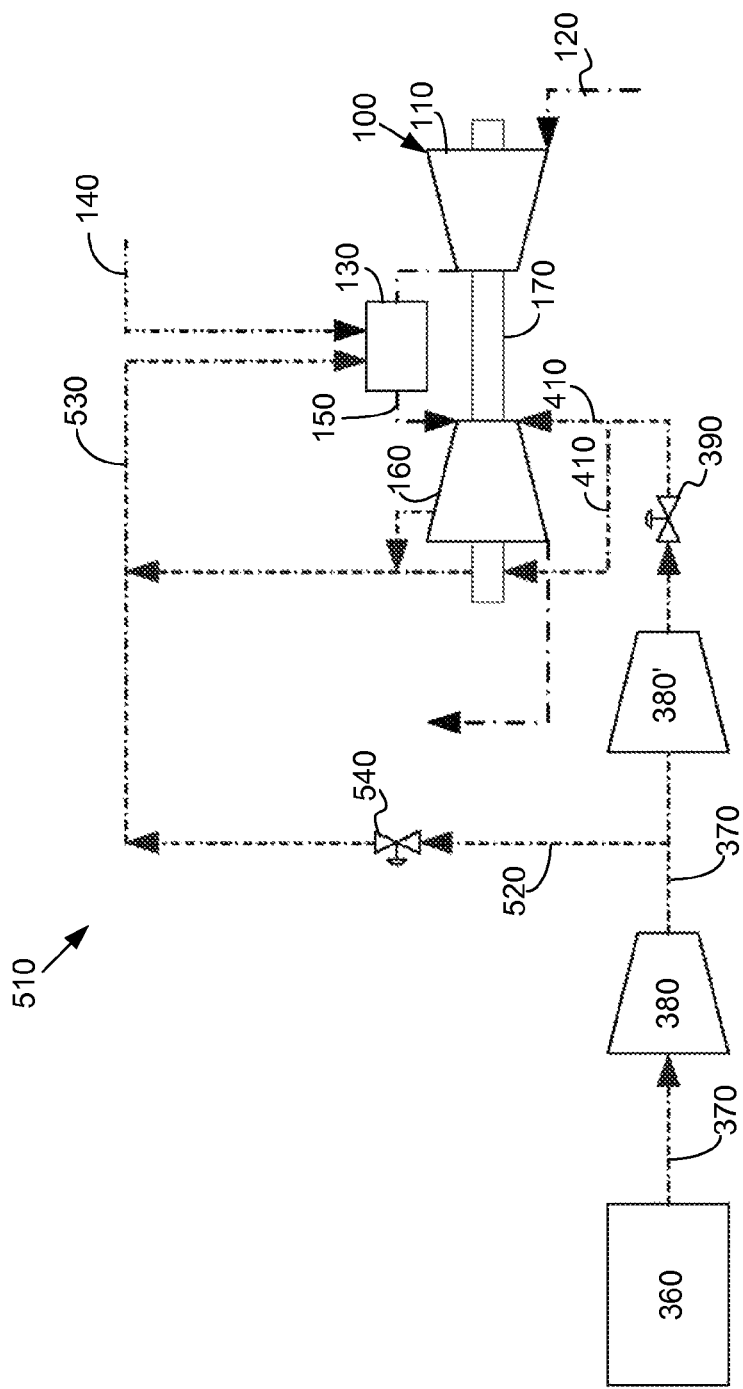
FIG. 6 is an alternative embodiment of the integrated gasification combined cycle system with a nitrogen cooled gas turbine.

FIG. 6 shows a further alternate embodiment of an integrated gasification combined cycle system 510. The IGCC system 510 may be similar to the IGCC system 350 described above. In this example, the flow of nitrogen 370, after passing through the turbine cooling passages 400, 410, mixes with an additional nitrogen flow 520 from the nitrogen compressor 380. A mixed nitrogen flow 530 then may be delivered to the combustor 130. A mixing valve 540 may be provided to control the flow split between the two mixing nitrogen streams 370, 520. Other configurations may be used herein.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

I claim:
1. A nitrogen cooled gas turbine system, comprising:
a nitrogen source;
a gas turbine comprising: a compressor section, a combustor, and a turbine section;
a nitrogen supply line connecting the nitrogen source to one or more nitrogen compressors;
a compressed nitrogen line connecting the one or more nitrogen compressors to an inlet of a closed loop cooling circuit in the turbine section, wherein a flow of nitrogen from the nitrogen source passes through and cools the turbine section;

a nitrogen recovery line connecting an outlet of the closed loop cooling circuit to a three-way valve;

a combustor flow line connecting the three-way valve to the combustor;

a return flow line connecting the three-way valve to the nitrogen supply line.

2. The nitrogen cooled gas turbine system of claim 1, wherein the nitrogen source comprises an air separation unit.

3. The nitrogen cooled gas turbine system of claim 1, wherein the closed loop cooling circuit in the turbine section comprises a rotating component cooling flow and a stationary component cooling flow.

4. The nitrogen cooled gas turbine system of claim 1, further comprising a nitrogen cooler positioned downstream of the turbine section in the return flow line.

5. The nitrogen cooled gas turbine system of claim 1, further comprising a fuel heater positioned upstream of the combustor in the combustor flow line to heat a flow of fuel supplied to the combustor.

6. A method of operating a nitrogen cooled gas turbine system, comprising the steps of:

generating a flow of nitrogen;

compressing the flow of nitrogen;

flowing the compressed flow of nitrogen through a gas turbine;

cooling the gas turbine by heating the compressed flow of nitrogen as it flows through the gas turbine;

dividing the now heated flow of nitrogen into a combustor nitrogen flow and a return nitrogen flow;

injecting the combustor nitrogen flow into a combustor of the gas turbine to reduce a combustor operating temperature; and cooling the return nitrogen flow by heating a flow of fluid to generate a cooled return nitrogen flow.

7. The method of claim 6, further comprising the step of cooling the combustor nitrogen flow by heating a flow of fuel supplied to the combustor.

8. The method of claim 6, further comprising the step of recirculating the cooled return nitrogen flow to the flow of nitrogen.

9. A nitrogen cooled gas turbine system, comprising:

an air separation unit for generating a flow of nitrogen;

a nitrogen compressor for compressing the flow of nitrogen;

a turbine comprising: a compressor section, a combustor, and a turbine section;

a nitrogen supply line connecting the air separation unit to the nitrogen compressor;

a compressed nitrogen line connecting the nitrogen compressor to an inlet of a closed loop cooling circuit in the turbine section, wherein a compressed flow of nitrogen passes through and cools the turbine section;

a nitrogen recovery line connecting an outlet of the closed loop cooling circuit to a three-way valve;

a combustor flow line connecting the three-way valve to the combustor;

a return flow line connecting the three-way valve to the nitrogen supply line between the air separation unit and the nitrogen compressor.

10. The nitrogen cooled gas turbine system of claim 9, wherein the closed loop cooling circuit in the section comprises a rotating component cooling flow and a stationary component cooling flow.

11. The nitrogen cooled gas turbine system of claim 9, further comprising a nitrogen cooler positioned downstream of the turbine section in the return flow line.

* * * * *